United States Patent [19]

Wheatley

[11] 4,134,571
[45] Jan. 16, 1979

[54] DOUBLE-DISC GATE VALVE

[75] Inventor: Seth J. Wheatley, Oak Ridge, Tenn.

[73] Assignee: The United States of America as represented by the United States Department of Energy, Washington, D.C.

[21] Appl. No.: 847,999

[22] Filed: Nov. 3, 1977

[51] Int. Cl.² .............................................. F16K 3/04
[52] U.S. Cl. .................................... 251/86; 251/167; 251/197
[58] Field of Search ................ 251/167, 197, 199, 200, 251/86

[56] References Cited

U.S. PATENT DOCUMENTS

| | | | |
|---|---|---|---|
| 1,999,155 | 4/1935 | Karnath | 251/167 |
| 2,895,709 | 7/1959 | Rattigan | 251/199 X |
| 3,815,868 | 6/1974 | Bobo | 251/86 |

Primary Examiner—Harold W. Wealsley
Attorney, Agent, or Firm—Dean E. Carlson; Stephen D. Hamel; Fred O. Lewis

[57] ABSTRACT

This invention relates to an improvement in a conventional double-disc gate valve having a vertically movable gate assembly including a wedge, spreaders slidably engaged therewtih, a valve disc carried by the spreaders. When the gate assembly is lowered to a selected point in the valve casing, the valve discs are moved transversely outward to close inlet and outlet ports in the casing. The valve includes hold-down means for guiding the disc-and-spreader assemblies as they are moved transversely outward and inward. If such valves are operated at relatively high differential pressures, they sometimes jam during opening. Such jamming has been a problem for many years in gate valves used in gaseous diffusion plants for the separtion of uranium isotopes.

The invention is based on the finding that the above-mentioned jamming results when the outlet disc tilts about its horizontal axis in a certain way during opening of the valve. In accordance with the invention, tilting of the outlet disc is maintained at a tolerable value by providing the disc with a rigid downwardly extending member and by providing the casing with a stop for limiting inward arcuate movement of the member to a preselected value during opening of the valve.

10 Claims, 4 Drawing Figures

DOUBLE-DISC GATE VALVE

The invention was made in the course of, or under, a contract with the U.S. Energy Research and Development Administration.

BACKGROUND OF THE INVENTION

This invention relates generally to gate valves and more particularly to gate valves having two valve discs for respectively closing the inlet and outlet ports of the valve, the valve discs being lowered along a vertical axis to a position between the ports and then being moved transversely of the axis to close the ports.

FIG. 1 is a schematic showing in perspective a double-disc gate valve which, with the exception of components 69 and 71, is of conventional design. Referring to FIG. 1, the conventional components of the valve include an elongated valve body, or casing, 1 whose lower portion encloses tubular seat bodies 3 and 5. The bodies 3 and 5, which respectively define valve ports 7 and 9, terminate respectively in opposed annular valve seats 11 and 13. As shown, process pipes 15 and 17 are respectively connected to the valve ports. Extending through the top portion of the casing 1 is a stem 19 whose external end is connected to suitable means for raising and lowering the stem. The lower end of the stem supports a wedge-shaped body 21. The wedge extends transversely of the stem and is positioned with its thinner edge downward. The ends of the wedge are provided with grooves 25 and 27 for slidably engaging longitudinally extending, opposed guide rails 23 on the casing, only one of these rails being in view in FIG. 1.

As shown, the slides of the wedge 21 are provided with upwardly extending grooves 29 and 31 for slidably-retaining disc-spreaders 33 and 35 respectively, as by means of dove-tail joints. The spreaders are wedge-shaped and are disposed with their thinner edges upward; thus, longitudinal movement of the wedge relative to the spreaders moves the latter transversely in the casing. Valve discs 37 and 39 are rotatably coupled to the spreaders 33 and 35, respectively, and are positioned outwardly thereof. The coupling 40 between each disc and its spreader is designed with a small amount of play for facilitating mating of the disc and its seat. As shown, each spreader is provided with a central, downwardly extending tongue 59 having a lateral projection 61 (FIG. 2) which extends close to the face of the associated valve disc to stabilize the position of the disc. The tongue for the spreader 33 is not in view in FIG. 1. The outer face of the inlet valve disc 39 is provided with a sealing ring 41 for engaging the inlet valve seat 13; the outer face of valve disc 39 is provided with a similar sealing ring (not in view) for engaging the outlet seat 11.

Closing of the valve shown in FIG. 1 is effected by lowering the stem 19 from the position shown. The resulting downward movement of the gate assembly (i.e., the wedge-spreader-and-disc assemblies) is guided by the rails 23. Mounted to the inside wall of the casing are two pairs 43 and 45 opposed stops, only one member of each pair being in view. When the gate assembly is lowered to the position where the valve discs are in alignment with their respective seats, 11 and 13, the stops 43 intercept the ends of the spreader 33; similarly, the stops 45 intercept the ends of the spreader 35. Thus, continued downward movement of the stem 19 and wedge 21 forces the disc-and-spreader assemblies transversely outward, moving the spreaders 33 and 35 immediately beneath pairs 47 and 49 of opposed hold-down blocks, respectively, and moving the discs 37 and 39 into sealing engagement with their respective seats. As the outlet disc 37 nears its seat, a lug 65 carried by the top of the disc moves immediately under a hold-down block 67 mounted to the inside of the casing. The action of the various hold-down blocks is described in more detail below.

When the stem 19 is lifted to open the valve, the initial upward movement of the stem lifts the wedge 21 relative to the spreader-and-disc assemblies. Because the various hold-down blocks oppose upward movement of the spreader-and-disc assemblies, these assemblies are retracted transversely inward; thus, scraping between the sealing rings and valve seats is avoided. During retraction, the outlet disc lug 65 moves out from under its hold-down block 67, following which the spreaders 33 and 35 move out from under their respective hold-down blocks 47 and 49. Further upward movement of the stem lifts the gate assembly to the fully open position shown.

For about thirty years, large motor-driven gate valves have been in use in the United States gaseous diffusion plants for the separation of uranium isotopes. The gate valves originally installed in the plants were generally similar to the valve shown in FIG. 1, but were not provided with the components designated therein as 65, 67, 69, and 71. During the first several years of process use, it was found that the valves sometimes jammed when operated at relatively high pressure differentials. That is, sometimes jamming occured during opening of a gate valve whose inlet pressure exceeded its outlet pressure by more than a certain amount. This jamming typically resulted in severe damage to the valve, making necessary to remove a block of isotope-separation stages from the process stream for several hours while the damaged valve was removed and replaced. Typically, the jamming resulted in bending or breakage of the joint between the outlet spreader 33 and the wedge 21, as well as in occasional distortion or breakage of the wedge 21 near the guide rails 23. It was apparent that the inlet disc 39 was opening before the outlet disc 37 had opened, and that the resulting application of the full pressure differential to the outlet disc was preventing it from retracting without somehow cocking sufficiently to jam.

In an attempt to solve this problem, the diffusion-plant gate valves were modified in 1957 by providing the outlet discs with the above-described hold-down arrangement 65, 67. This arrangement was provided to supplement the hold-down action of the blocks 43 for the outlet spreader and thus ensure that the outlet disc retracted properly. This modification did not solve the problem, however, and since 1957 costly valve failures of the kind described have occurred from time to time, even in valves which had successfully passed static-load tests before installation. Because of such failures and because of interest in the use of higher operating pressures, studies of the jamming problem were made. As a result, various re-designs of the valve were proposed, but none of these was found acceptable. As an example, one proposed re-design of the outlet-disc assembly was based on the belief that during retraction the outlet disc turns somewhat about its vertical axis, assuming a cocked position causing jamming.

OBJECTS OF THE INVENTION

It is, therefore, an object of this invention to provide an improved double-disc gate valve.

It is another object to provide a modified double-disc gate valve which opens reliably despite relatively high pressure differentials across the valve.

It is another object to provide a double-disc gate valve with simple and reliable means for maintaining proper orientation of the outlet disc during opening of the valve.

The drawings are not to scale.

SUMMARY OF THE INVENTION

The invention may be summarized as follows: In a gate valve including a casing containing opposed annular seats respectively defining inlet and outlet ports; a gate assembly movable longitudinally in said casing and including inlet and outlet discs for respectively closing the inlet and outlet ports, spreaders respectively coupled to the discs to provide inlet and outlet spreader-and-disc assemblies, and a wedge positioned between and slidably engaged with said spreaders; means for longitudinally moving said assembly to and from a lowered position where said discs are between and in register with said seats and for transversely moving the disc-and-spreader assemblies, when in said lower position, to open and close said ports; and hold-down means carried by said casing for guiding the transverse movement of said discs outwardly and inwardly away from their seats; the improvement comprising: a rigid member carried by the outlet disc and extending downwardly thereof, and a stop carried by said casing for intercepting said member to impose a limit to inward arcuate movement thereof during retraction of the outlet disc from its seat.

CROSS-REFERENCED PATENTS

U.S. Pat. No. 2,520,364, to Hobbs, describes a double-disc gate valve whose design is generally similar to that shown in FIG. 1 and which is subject to the above-described jamming problem. U.S. Pat. No. 3,815,868 describes a modified form of the same gate valve.

DESCRIPTION OF THE PREFERRED EMBODIMENT

Figures 1, 2:
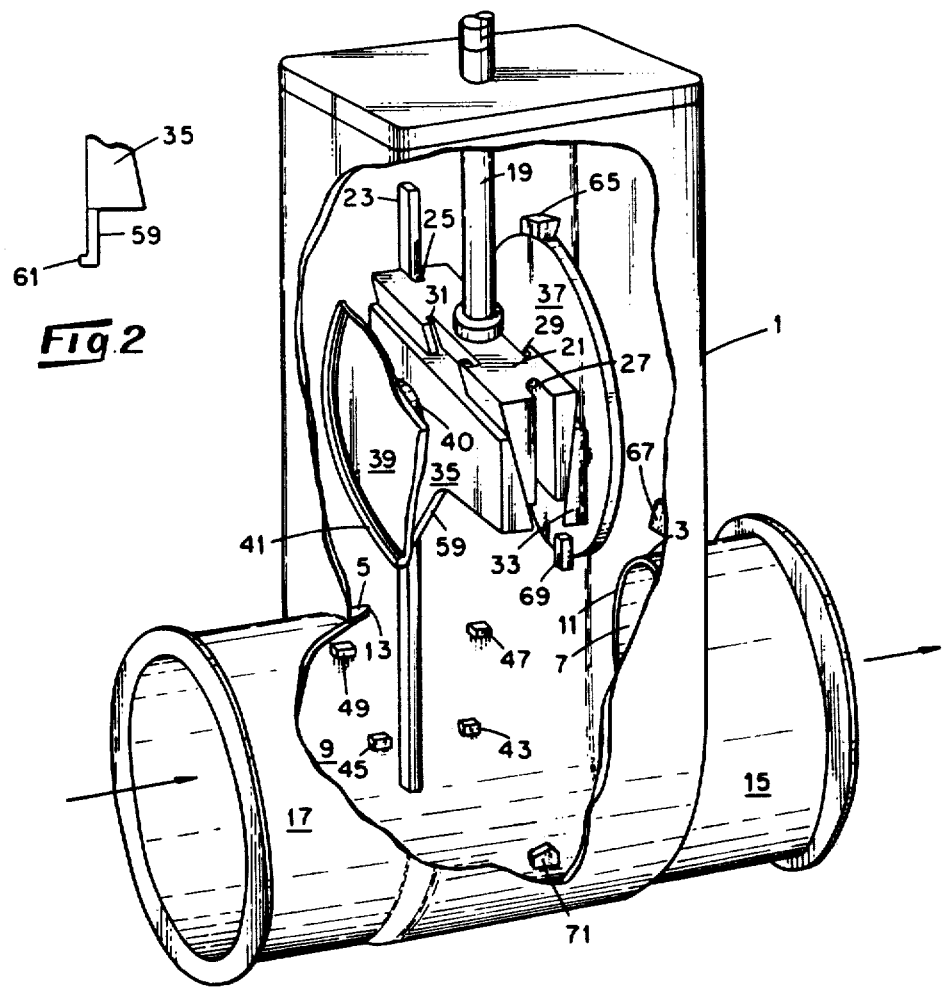
FIG. 1 is a schematic view in perspective of a double-disc gate valve which has been modified in accordance with this invention, part of the valve casing being cut away.
FIG. 2 is an end view of part of a spreader shown in FIG. 1.

This invention is based on my finding of the cause of the above-discussed jamming in double-disc gate valves. After inspecting various jammed diffusion-plant valves which had previously performed satisfactorily in static tests, I theorized that if one portion of the outlet disc were to lift off its seat before the remainder of the disc, the resulting rush of process gas through the disc-to-seat clearance would cock the retracting disc sufficiently to cause jamming. Accordingly, a typical double-disc gate valve (disc diameter, 30") was subjected to a modified static-load test. In the usual static test, the valve is opened while a selected load (e.g., 17,000 pounds) is applied to the outlet disc by means of a cable connected to the center of the downstream face of the disc. In the modified test, provisions were made to attach the cable to alternative points located two inches below and two inches above the center of the downstream face of the outlet disc. The upstream disc was removed to permit observation of the outlet disc while opening. With the load applied to the point below the center of the disk, the valve could be opened without difficulty. But, with the test load connected two inches above the center of the disc, the disc tilted from the vertical while opening. That is, the bottom portion of the disc tilted toward the valve inlet and thus lifted off the seat before the top of the disc had lifted, with the result that the disc lug 65 jammed against the disc hold-down block 67, and the spreader 33 jammed against its hold-down blocks 47. Because the gate assembly began to deform in the manner characteristic of jammed gate valves, the test was stopped. This test indicated that it was tilting of the kind described which was causing the valves to jam. Subsequent tests confirmed that it was primarily the friction between the outlet disc lug and its hold-down block 67 which caused the bottom edge of the disc to lift off its seat before the remainder of the disc. It is believed that jamming of the pre-1957 gate valves not provided with the disc hold-down arrangement 65, 67 was due to similar tilting resulting from the friction between the spreader 33 and its hold-down blocks 47.

Figure 3:
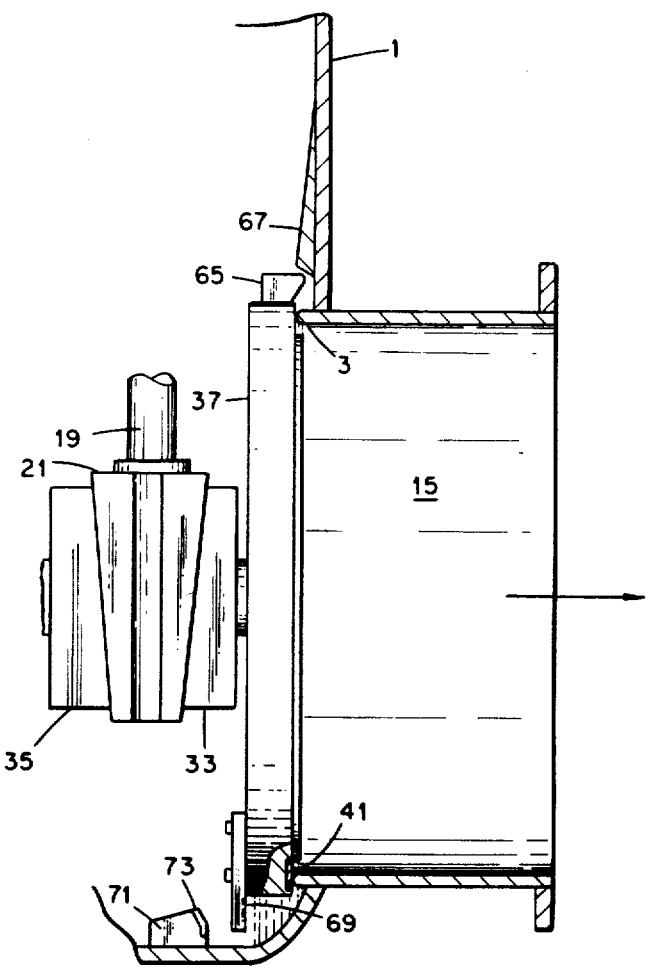
FIG. 3 is a partly sectional side view of part of the valve shown in FIG. 1, a valve outlet disc 37 being shown in the seated position.
Figure 4:
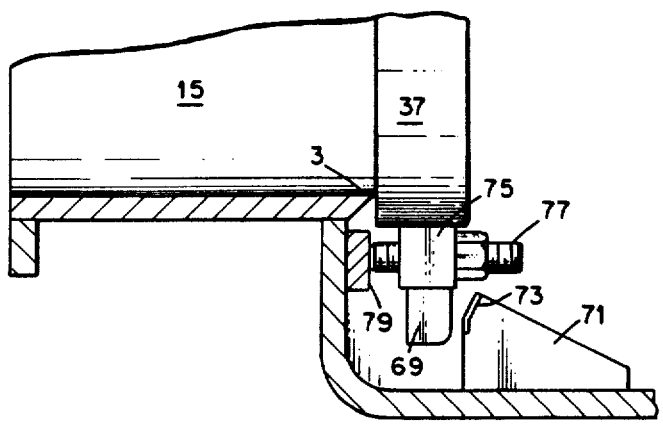
FIG. 4 is a similar view of part of a gate valve provided with an alternative embodiment of the invention.

As a result of the above-described finding of the cause of jamming, I have modified the conventional gate valve so that it opens reliably despite relatively high pressure differentials across the valve. As illustrated in FIGS. 1 and 3, the modification includes a rigid arm 69, which is affixed to the back face of the outlet disc 37 and which extends downwardly below the lower edge of the disc. Preferably, the arm is coplanar with the vertical centerline of the disc. The modification also includes a stop 71, which is mounted in the bottom portion of the valve casing to intercept the arm 69 so as to impose a limit to the amount of tilting which the disc may incur during retraction from under its hold-down block 67. That is, the spacing between the stop 71 and arm 69 is preselected so that during opening of the valve, the stop limits arcuate inward movement of the arm 69 (and thus the outlet disc) to a selected, tolerable amount while the disc is being retracted from under its block 67. Typically, the spacing is selected to limit the inward arcuate movement from the vertical to a value in the range of from 0.5 to 4°. After the disc has moved out from under its hold-down block 67 (and after the spreaders have moved out from under their blocks 47, 49), the gate assembly moves upward, lifting the arm 69 along the stop 71 and then above it. During closing of the valve, the disc arm 69 contacts a hardened surface 73 of the stop during descent of the gate assembly to the position where the discs are in register with their seats. Further descent of the wedge 21 seats the discs as previously described, so that the arm 69 ultimately is in spaced, confronting relation with the stop 71, as illustrated in FIG. 4.

It will be apparent to those versed in the art that the disc arm 69 and the stop 71 may have various configurations and accomplish the purposes of the invention. The disc arm may be any suitable rigid member which is carried by the outlet disc and projects downwardly therefrom. If desired, the extension may be mounted directly to the rim of the disc. FIG. 4 illustrates a somewhat different arrangement, where the extension 69 is mounted to part of a conventional seat-stop assembly for preventing crushing the mating surfaces of the outlet disc and its seat. The seat-stop assembly includes a boss 75, which is affixed to the bottom edge of the disc at a point along the vertical centerline thereof. The boss carries an adjustable stud 77, which on closure of the valve engages a stop 79 in the casing, thus limiting the compressive load on the sealing surfaces. As shown, the disc arm, or extension, 69 is mounted to the boss to extend downwardly therefrom. The stop 7, which may be of any suitable shape, is positioned to intercept the extension as described.

Diffusion-plant gate valves modified in accordance with this invention have been operated satisfactorily in test loops where the valves have been repeatedly opened and closed to control the flow of gaseous uranium hexafluoride ($UF_6$). The gas pressure in these loops equaled or exceeded the "jamming value" for conventional gate valves of the kind described above. One type of valve which operated successfully in these tests was a conventional 42-inch-diameter double-disc gate valve which had been modified in accordance with this invention as illustrated in FIG. 4. In that instance, the extension 69 was of square cross-section and was composed of K-500 Monel (hot-formed; age-hardened; Brinnel hardness, 265–315). The stop 71 was of the general configuration shown in FIG. 4 and had a length of 6", a width of 1⅛", and a height tapering from 3¼" to ⅛". The stop was composed of nickel-plated steel, with the exception of those surfaces contacted by the extension; these were provided with an aluminum-bronze overlay. The stop and extension were welded in place. Referring to the valve-closed position (FIG. 4), the design spacing between the extension 69 and its stop 71 was ⅛", whereas the design clearance for the top disc lug 65 and its hold-down block 67 (FIG. 3), was 0.05"; the latter two components were designed with an overlap of 9/16". The 42" valve disc had a thickness of 3".

The invention has been illustrated as utilized to prevent jamming in double-disc gate valves having two kinds of hold-down means—one kind (47 and 49, FIG. 1) being provided for the spreaders and the other kind (65 and 67, FIG. 3) being provided for the outlet disc. However, the arm-and-stop arrangement also may be employed to prevent jamming in valves in which the only hold-down means are the blocks 47, 49 for the spreaders, since friction between the outlet spreaders and its hold-down blocks may result in tilting of the outlet disc during opening.

Although the invention has been illustrated above in terms of a single disc arm 69 and stop 71 therefor, it will be apparent that various modifications may be made within the scope of the invention as set forth in the appended claims. For example, the outlet disc may be provided with, say, two downwardly extending disc arms, one on either side of the vertical centerline of the disc, and the valve casing may be provided with two stops for respectively limiting arcuate movement of the arms to effect the purposes of the invention.

What is claimed is:

1. In a gate valve including a casing containing opposed annular seats respectively defining inlet and outlet ports; a gate assembly movable longitudinally in said casing and including inlet and outlet discs for respectively closing the inlet and outlet ports, spreaders respectively coupled to the discs to provide inlet and outlet spreader-and-disc assemblies, and a wedge positioned between and slidably engaged with said spreaders; means for longitudinally moving said assembly to and from a lowered position where said discs are between and in register with said seats and for transversely moving the disc-and-spreader assemblies, when in said lower position, to open and close said ports; and hold-down means carried by said casing for guiding the transverse movement of said discs outwardly and inwardly away from their seats; the improvement comprising:

a rigid member carried by the outlet disc and extending downwardly thereof, and a stop carried by said casing for intercepting said member to impose a limit to inward arcuate movement thereof during retraction of the outlet disc from its seat.

2. The combination of claim 1 wherein said member is coplanar with the outlet disc.

3. The combination of claim 1 wherein said member is affixed to the inner face of the outlet disc.

4. The combination of claim 1 wherein the disc is provided with a lug extending above the top edge of the disc and wherein said hold-down means includes a block on said casing which vertically overlaps said lug when the outlet disc is in the seated position.

5. The combination of claim 4 wherein said hold-down means also includes bosses in said casing which are in vertical overlapping relation with respective ends of said spreaders during transverse movement of said disc-and-spreader assemblies.

6. In a gate valve including a casing containing opposed annular seats respectively defining inlet and outlet ports; a gate assembly movable vertically in said casing and including (a) inlet and outlet discs for respectively closing the inlet and outlet ports, the outlet disc being provided with a lug extending upwardly thereof, (b) spreaders respectively coupled to the discs to provide inlet and outlet spreader-and-disc assemblies, (c) a wedge positioned between and slidably engaged with said spreaders; means for vertically moving said assembly to and from a lowered position where said discs are between and in register with said seats and for moving the lowered disc-and-spreader assemblies transversely outward and inward to respectively close and open said ports; and hold-down means carried by said casing for guiding said discs transversely outward, said means including a block which vertically overlaps said lug when the outlet disc is in the seated position; the improvement comprising:

a rigid member carried by said outlet disc and extending downwardly thereof, and a stop mounted in the bottom portion of said casing and spaced inwardly of said member for limiting inward arcuate movement thereof to a selected value during retraction of the outlet disc from its seat.

7. The combination of claim 6 wherein said stop is positioned to limit said arcuate movement to less than 4° from vertical.

8. The combination of claim 6 wherein said member is coplanar with the outlet disc.

9. The combination of claim 8 wherein said member is mounted to a boss affixed to the lower edge of the outlet disc.

10. The combination of claim 6 wherein said member is affixed to the inner face of the outlet disc.

* * * * *